Feb. 27, 1923.
E. J. WALTON
1,447,161
AUTOMOBILE CONSTRUCTION OR THE LIKE
Filed Mar. 31, 1921
2 sheets-sheet 2
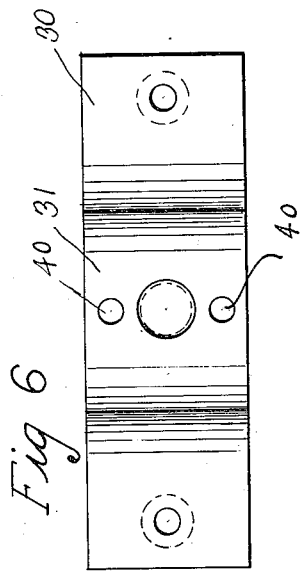
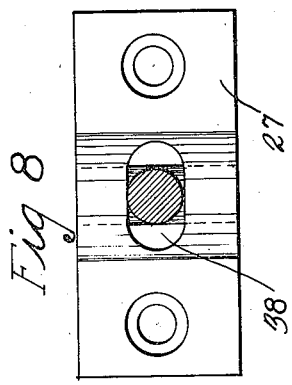
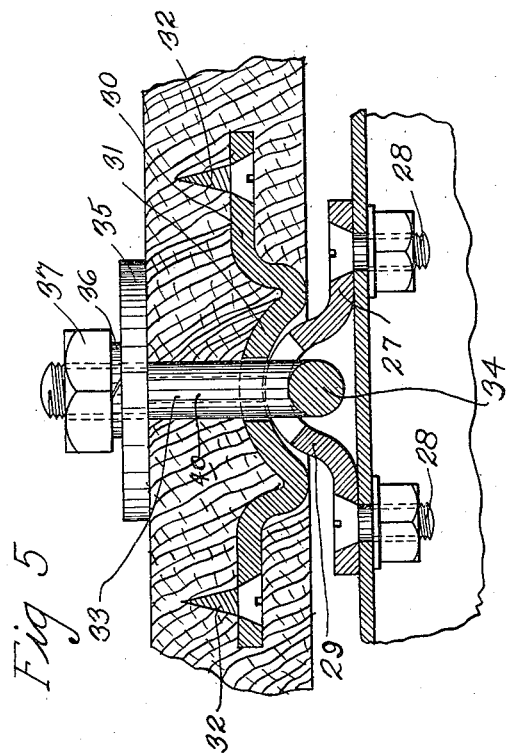
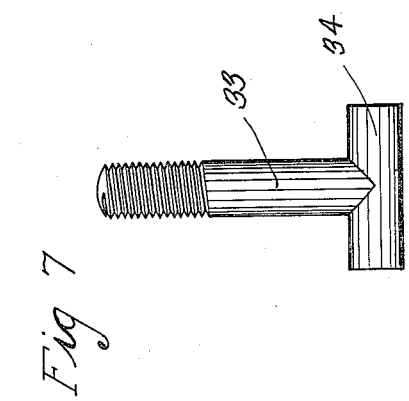

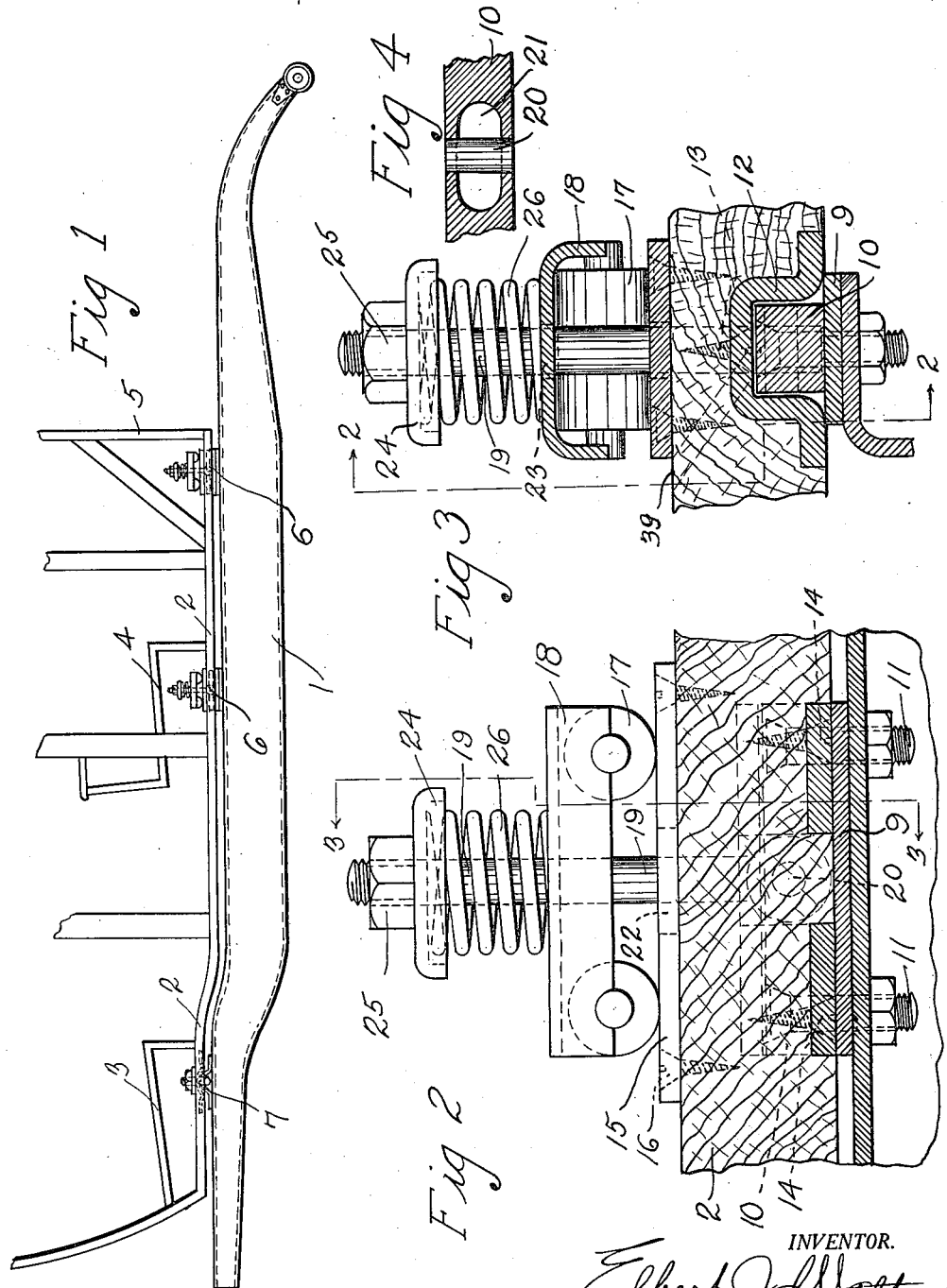

Patented Feb. 27, 1923.

1,447,161

UNITED STATES PATENT OFFICE.

ELBERT J. WALTON, OF UNION CITY, INDIANA.

AUTOMOBILE CONSTRUCTION OR THE LIKE.

Application filed March 31, 1921. Serial No. 457,435.

*To all whom it may concern:*

Be it known that I, ELBERT J. WALTON, a citizen of the United States, residing at Union City, in the county of Randolph and State of Indiana, have invented certain new and useful Improvements in Automobile Constructions or the like, of which the following is a specification, reference being had therein to the accompanying drawings.

This invention relates to improvements in automobile construction, having particular reference to a novel arrangement for mounting the body on the chassis frame.

As is well known, the more or less constant tortional stresses on the body of an automobile, transmitted through the chassis frame from the ground wheels, or from the weight of occupants of the machine and the weight of the body itself, tends generally to affect the alignment of the body assembly, and also to cause cracking or checking and scaling of the body finish to such extent as to materially detract from the appearance of the machine.

The main object of my invention therefore, is to provide means for minimizing such tortional stresses of automobile bodies, and also materially to lessen in the body the force of wheel shocks transmitted through the chassis,—thus to effect easier riding qualities of the machine.

To this end my invention provides for easement of connections and body adjustments, and for relative movement between the body and the chassis frame to cause the body to ride evenly on the frame with the required amount of free movement relative thereto to practically overcome the twisting or torsional movements of the body which are common in the usual construction.

The invention is further effective to minimize strains on the machine as a whole, —thus providing for compensating adjustment between the chassis frame and body and less tendency of the structure as a whole to become racked from the stress of usage.

As far as I am aware, the principle of my invention, as illustrated in the accompanying drawings and described in the detailed specification is broadly new,—it being the first practical solution to my knowledge of the problem to which the invention is directed. I desire, therefore, to treat the invention broadly as defined and comprehended in the terms and spirit of the appended claims.

In the drawings:

Fig. 1 is a detail view in said elevation of an automobile chassis frame and body illustrating in general outline the application of my improved construction thereto;—

Fig. 2 is a detail view in side elevation, partially in section of one unit of the improved construction as applied between the front portion of the body and the chassis frame;

Fig. 3 is a vertical cross sectional view of the construction shown in Fig. 2;

Fig. 4 is a view of a detail pertaining to Fig. 3;

Fig. 5 is a view in side elevation, partially in section, of one unit of the invention as applied between the rear portion of the machine and the chassis frame, and Figs. 6, 7, and 8 are views of details pertaining to Fig. 5.

As herein described the invention is shown as applied to an automobile of the usual construction, comprising the chassis frame 1 and portions of the body structure 2, 3, 4, and 5 the novel connections between the body and frame comprised in the invention being shown in outline as indicated at 6—6 and 7, the connections being applied under the front and rear seats and forward under the floor boards adjacent the dash where the same will be out of sight, and there will be no projections into the open space of the body.

The invention as here shown applied to an automobile consists of a double set of connections,—the front set 6—6 consisting of four complete units, two on each side of the machine, of mechanism illustrated in Figs. 2, 3, and 4, applied between the body frame 2 and the opposite channel rails 8 of chassis frame 1; and the rear set consisting of two opposite units 7 of the mechanism illustrated in Figs. 5 to 8, applied between the body and chassis frame,—thus the automobile body is balanced on the chassis and the required relative movement between the two as contemplated in the invention is provided for.

Each connection 6, as best illustrated in Figs. 2 and 3, consists of a base plate 9 having a bearing block 10 mounted thereon and both secured to the chassis frame by means of bolts 11. Covering the bearing block and resting on the base plate is a channelled member 12 which is encased in the wood portion 2 of the body frame and secured thereto by means of screws 13—14, thus serving to strengthen the frame where the connection is made. On its upper edge, opposite the channel member 12 the wood frame 2 is reinforced by a flat metal plate 15 secured to the wood by screws 16, and mounted on plate 15 are rollers 17 operably supported under an inverted channel frame 18. A bolt 19, as here shown, is pivoted in bearing block 10 as at 20, an elongated vertical aperature 21 being provided in the block to afford clearance for the pivotal connection.

Bolt 19 is extended upwardly through an elongated aperture 22 in plate 15 and an aperture 23 in channelled frame 18 between rollers 17,—the end of the bolt projecting upwardly substantially beyond frame 18 and having a spring retaining disc 24 and nut 25 provided at its end,—a compression spring 26 being interposed between disc 24 and roller frame 18.

The rear connection between the body and chassis frame, as here shown in detail in Figs. 5 to 8, consists of a rocker or pivotal bearing comprising a lower base plate 27 secured to the chassis frame by means of bolts 28 and having a medial upwardly extended portion 29 which forms a rocker or pivotal bearing support for the rear portion of the body,—the upper member of the bearing consisting of a base plate 30, secured to the body by means of screws 32, and having a medial bearing portion 31 cooperating with the raised bearing 29 of lower plate 27. The body is held in operative relation to the bearing and to the chassis frame by means of a T-bolt 33, the head 34 of which forms a pivotal bearing in lower plate 27,— the stem of the bolt projecting upwardly through the lower portion of the body frame and being secured thereto by means of a base washer 35, lock washer 36 and nut 37. Bearing 29 of base plate 27 is provided with an elongated aperture 38 to provide for free rocking or pivotal movement of bolt 33 therein and free rocking movement of the body on the chassis frame.

From the foregoing detailed description the application of my invention, in the form here shown, and the effect of the same on the machine will be readily understood. It will be seen that the yieldable connections between the central and front portions of the body and chassis frame provide for relative movement between the body and frame to compensate for tortional stresses, etc., which result in the operation of the machine, the body of the machine as a whole rocking on the rear base connections to accommodate the movements of the same relative to the chassis frame. The relative movement thus provided for between the body and frame compensates for the normal tortional stresses which otherwise are transmitted to the body and, therefore, minimizes the force and effect of the same on the body. The arrangement also serves materially to absorb shocks transmitted through the frame from the ground wheels and thus contributes to the easy riding qualities of the automobile.

These improvements, as contemplated in the invention, and provided for in one form of preferred construction herein illustrated and described, are effective to minimize the rack resulting from usage on the body and chassis frame and, therefore, to prolong the life of the machine, and also to overcome the cracking and scaling of the body finish which under ordinary construction results from the tortional stress thereon.

Any suitable means for lubricating the mechanism of the improved connections may be employed. As here shown, in Figs. 3, 5 and 6 ducts 39 and 40 are provided for supplying oil or other suitable lubricants to connections 6 and 7.

Having described my invention, I claim:

1. In an automobile, including in combination with the body and chassis frame thereof, rocker bearings interposed between said body and the opposite frame members adjacent the rear ends thereof comprising a base plate supported on said frame, a rocker plate supported in said body, and means to retain said plates in normal operative relation, and yieldable connections interposed between the body and said opposite frame members forwardly of said bearings to compensate for movements of the body relative to said frame,—the body being supported free of the chassis frame upon said bearings and connections, and having limited pivotal movement on said bearings relative to said frame.

2. In an automobile, including in combination with the body and chassis frame thereof, rocker bearings interposed between said body and the opposite frame members adjacent the rear ends thereof comprising a base plate supported on said frame, a rocker plate supported in said body, and means to retain said plates in normal operative relation, and a series of yieldable connections interposed between the body and each of said opposite frame members forwardly of said bearings to compensate for movements of the body relative to said frame,—the body being supported free of the chassis frame upon said bearings and connections, and having limited pivotal movement on said bearings relative to said frame.

3. In an automobile, including in combination with the body and chassis frame thereof, rocker bearings interposed between said body and the opposite frame members adjacent the rear ends thereof comprising a base plate supported on said frame, a rocker plate supported in said body, and means to retain said plates in normal operative relation, and yieldable connections interposed between the body and said opposite frame members forwardly of said bearings to compensate for movements of the body relative to said frame,—and each comprising a vertically extended, pivotally operable member secured to the chassis frame, and a resilient element between the free end of said member and said body,—the body being supported free of the chassis frame upon said bearings and connections.

4. In an automobile, including in combination with the body and chassis frame thereof, rocker bearings interposed between said body and the opposite frame members adjacent the rear ends thereof comprising a base plate, a rocker plate and a rocker bolt acting to retain said plates in normal operative relation, and yieldable connections interposed between the body and said opposite frame members forwardly of said bearings to compensate for movements of the body relative to said frame,—and each comprising resilient and anti-friction devices,—the body being supported free of the chassis frame upon said bearings and connections.

5. In an automobile, including in combination with the body and chassis frame thereof, rocker bearings interposed between said body and the opposite frame members adjacent the rear ends thereof, and yieldable connections interposed between the body and said opposite frame members forwardly of said bearings to compensate for movements of the body relative to said frame,—and each comprising a spring element and a roller-bearing element coacting one with the other,—the body being supported free of the chassis frame upon said bearings and connections.

6. In an automobile, the combination with the body and chassis frame, thereof, of pivotal connections interposed between rear portions of said body and frame on opposite sides thereof, and connections between said body and frame forward of the rear connections each comprising an upwardly extended, reciprocally operable member mounted on the chassis frame, a roller bearing operable with said member and cooperating with said body, and a spring interposed between the free end of said member and said bearing.

7. In an automobile, including in combination with the body and chassis frame thereof, connections having relatively limited movement interposed between said body, and the opposite frame members adjacent the rear ends thereof, and connections having relatively greater movement than said rear connections interposed between the body and said frame members forwardly of the rear connections to compensate for movements of the body relative to said frame, and means for regulating the extent of movement resulting in said connections in the operation of said machine.

8. In an automobile, including in combination with the body and chassis frame thereof, non-resilient connections having relatively limited movement interposed between said body and frame adjacent the rear ends thereof, and resilient connections having relatively greater movement than said rear connections interposed between the body and said frame forwardly of the rear connections to compensate for relative movements between said body and frame.

9. In an automobile, including in combination with the body and chassis frame thereof, a series of yieldable connections arranged in pairs on the opposite frame members, comprising adjustable resilient elements acting to compensate variably according to the adjustment thereof for relative tortional movement, and elements coacting with said resilient elements to compensate for relative longitudinal movement between said body and frame.

In testimony whereof, I affix my signature.

ELBERT J. WALTON.